US010619756B2

(12) United States Patent
Akase et al.

(10) Patent No.: US 10,619,756 B2
(45) Date of Patent: Apr. 14, 2020

(54) GAS SOLENOID VALVE

(71) Applicant: NABTESCO CORPORATION, Tokyo (JP)

(72) Inventors: Hiroshi Akase, Hyogo (JP); Daiki Ogino, Hyogo (JP)

(73) Assignee: NABTESCO CORPORATION, Tokyo (JP)

( * ) Notice: Subject to any disclaimer, the term of this patent is extended or adjusted under 35 U.S.C. 154(b) by 0 days.

(21) Appl. No.: 15/748,339

(22) PCT Filed: Jun. 29, 2016

(86) PCT No.: PCT/JP2016/069293
§ 371 (c)(1),
(2) Date: Jan. 29, 2018

(87) PCT Pub. No.: WO2017/022379
PCT Pub. Date: Feb. 9, 2017

(65) Prior Publication Data
US 2018/0202573 A1    Jul. 19, 2018

(30) Foreign Application Priority Data

Jul. 31, 2015 (JP) .................................. 2015-151892

(51) Int. Cl.
*F16K 31/06* (2006.01)
*F16K 25/00* (2006.01)
(52) U.S. Cl.
CPC ........ *F16K 31/0658* (2013.01); *F16K 25/005* (2013.01); *F16K 31/0624* (2013.01)
(58) Field of Classification Search
CPC ............. F16K 31/0658; F16K 31/0624; F16K 25/005; H01F 7/1607

(Continued)

(56) References Cited

U.S. PATENT DOCUMENTS 4,245,789 A  *  1/1981  Gray .................. F02M 51/0614
                                                      239/585.2
4,365,747 A  *  12/1982  Knapp ............... F02M 51/0646
                                                      239/125

(Continued)

FOREIGN PATENT DOCUMENTS

DE    4139671 A1    6/1993
JP    2-37341 Y2   10/1990

(Continued)

OTHER PUBLICATIONS

International Search Report PCT/JP2016/069293 dated Sep. 20, 2016 with English translation.

(Continued)

*Primary Examiner* — Matthew W Jellett
(74) *Attorney, Agent, or Firm* — Pillsbury Winthrop Shaw Pittman, LLP

(57) ABSTRACT

The present disclosure relates to a gas solenoid valve for controlling a flow rate of a gas. The gas solenoid valve includes a valve plug to be displaced in the main body between a closed position where the flow path is closed and an open position where the flow path is opened. The main body includes a retainer and a valve seat. The valve plug includes an armature surface and a valve part, the armature surface being displaced in accordance with the magnetic field, the valve part being formed integrally with the armature surface. The armature surface includes an opposed surface that is opposed to the retainer and contacts with the retainer when the valve plug is in the open position, so as to determine an amount of displacement of the armature surface. At least one of the opposed surface and a surface of the retainer is roughened.

11 Claims, 6 Drawing Sheets

(58) Field of Classification Search
USPC .............................. 251/129.16; 335/261, 279
See application file for complete search history.

(56) References Cited

U.S. PATENT DOCUMENTS

| | | | |
|---|---|---|---|
| 4,506,861 A | | 3/1985 | Showalter |
| 4,759,528 A | * | 7/1988 | Morris ................ F16K 31/0658 251/129.06 |
| 4,848,727 A | * | 7/1989 | Nanbu ................ F16K 31/0658 251/129.16 |
| 5,398,724 A | * | 3/1995 | Vars ........................ F02D 41/20 123/490 |
| 5,924,674 A | * | 7/1999 | Hahn ................ F02M 51/0614 251/129.01 |
| 6,415,817 B1 | * | 7/2002 | Krimmer ........... F02M 25/0836 137/550 |
| 7,388,461 B2 | * | 6/2008 | Ryuen ................ F16K 31/0631 335/251 |
| 8,763,984 B2 | * | 7/2014 | Johansson ........... F16K 31/0658 251/129.16 |
| 9,093,210 B2 | * | 7/2015 | Walter .................... H01F 7/081 |
| 2012/0305816 A1 | * | 12/2012 | Pohlmann ............... B22F 3/225 251/129.01 |
| 2014/0225018 A1 | * | 8/2014 | Tsuru ................. F02M 63/0021 251/129.15 |
| 2016/0003320 A1 | | 1/2016 | Kamakura et al. |

FOREIGN PATENT DOCUMENTS

| | | |
|---|---|---|
| JP | 7-83138 A | 3/1995 |
| JP | 11-247739 A | 9/1999 |
| JP | 2014-156884 A | 8/2014 |
| JP | 2014-156887 A | 8/2014 |

OTHER PUBLICATIONS

Office Action dated Jan. 3, 2019 issued in corresponding Chinese Patent Application No. 201680045130.4 with partial English translation.

Notice of Reasons for Refusal dated Jun. 4, 2019 issued in corresponding Japanese Patent Application No. 2015-151892 with English translation.

* cited by examiner

GAS SOLENOID VALVE

CROSS-REFERENCE TO RELATED APPLICATIONS

This application is the U.S. National Stage of PCT/JP2016/069293, filed Jun. 29, 2016, which in turn claims priority to Japanese Patent Application No. JP 2015-151892, filed Jul. 31, 2015. The contents of each of these applications are incorporated herein by reference in their entireties.

TECHNICAL FIELD

The present invention relates to a gas solenoid valve for opening and closing a flow path of a gas used as a working fluid.

BACKGROUND

Solenoid valves are used in various industrial fields. Patent Literature 1 discloses a solenoid valve used to supply a fuel to an engine.

The solenoid valve of Patent Literature 1 includes a valve plug and an armature extending from the valve plug toward a coil. The valve plug and the armature are coupled to each other with a screw.

Since the armature of Patent Literature 1 is formed of a member separate from the valve plug, a solenoid valve formed in accordance with the technique disclosed in Patent Literature 1 tends to have a large structure. The Inventors of the present invention devised a small solenoid valve different from the solenoid valve of Patent Literature 1. This small solenoid valve includes a movable piece constituted by an armature and a valve plug integrated together. The Inventors operated the small solenoid valve for a long period and tested the performance thereof. As a result of the performance test, it was found that the response performance of the solenoid valve produced by the Inventors drops significantly after a certain period of time from start of the test.

RELEVANT REFERENCES

List of Relevant Patent Literatures

Patent Literature 1: Japanese Patent Application Publication No. Hei 7-83138

SUMMARY

One object of the present invention is to provide a gas solenoid valve that retains a high response performance for a long period.

As a result of investigation on the above problem, the Inventors found that the amount of time required for the movable piece to return from an open position to a closed position is different between the start of the test and the time after a certain period. The Inventors found that the drop of response performance was caused by the change of the time required for returning from the open position to the closed position.

In the open position, the movable piece of the small solenoid valve devised by the Inventors contacts with a retainer for retaining a coil, by a magnetic force from the coil. The contact between the movable piece and the retainer causes mirror surfaces to be formed in the contacting regions thereof. The Inventors concluded that the mirror surfaces formed in the contacting regions caused the drop of response performance of the solenoid valve. The Inventors completed the present invention under the technical policy for overcoming the problem of drop of the response performance by preventing at least one of the movable piece and the retainer from having a mirror surface.

A gas solenoid valve according to an aspect of the present invention controls a flow rate of a gas. The gas solenoid valve comprises: a main body including an inlet for inflow of the gas, an outlet for outflow of the gas, and a flow path communicating between the inlet and the outlet and guiding the gas from the inlet to the outlet; and a valve plug to be displaced in the main body between a closed position where the flow path is closed and an open position where the flow path is opened. The main body includes a retainer and a valve seat, the retainer retaining a coil that produces a magnetic field, the valve seat receiving the valve plug to be seated thereon. The valve plug includes an armature surface and a valve part, the armature surface being displaced in accordance with the magnetic field, the valve part being formed on an opposite side to the armature surface integrally with the armature surface. The armature surface includes an opposed surface opposed to the retainer. The opposed surface contacts with the retainer when the valve plug is in the open position, so as to determine an amount of displacement of the armature surface from the closed position where the valve part contacts with the valve seat to the open position where the valve part is spaced apart from the valve seat. In a contacting region where the opposed surface and the retainer contact with each other, at least one of the opposed surface and a surface of the retainer is roughened.

The gas solenoid valve described above can retain a high response performance for a long period.

Objects, features, and advantages of the present invention will become apparent from the following detailed description and the accompanying drawings.

DESCRIPTION OF THE EMBODIMENTS

In the following description, the words indicating a direction, such as "upper (upward)," "lower (downward)," "vertical," and "horizontal," are intended only to simplify the description. Accordingly, these words indicating a direction do not limit the principle of the various embodiments described below.

First Embodiment

The Inventors of the present invention devised a small gas solenoid valve using a magnetic valve plug magnetized by a magnetic field produced from a coil. The magnetic valve plug is constituted by a single plate member, and thus it has a smaller size and weight than an assembly constituted by an armature and a valve plug fastened together. Therefore, the gas solenoid valve devised by the Inventors exhibited a high response performance in a performance test. However, the Inventors observed a significant response delay after a certain period of time from the start of the performance test. The Inventors investigated the cause of the response delay from various points of view.

In a solenoid valve handling a liquid as a working fluid, when a valve plug in an open position contacts with a wall surface, the valve plug is adhered to the wall surface by the surface tension of the liquid. Accordingly, a valve plug of a solenoid valve handling a liquid as a working fluid is spaced apart from a wall surface when in an open position. On the other hand, the Inventors focused on the surface tension of a gas that is far lower than that of a liquid, and employed the structure in which the magnetic valve plug contacts with the wall surface surrounding the magnetic valve plug, not only in a closed position where a flow path of the gas is closed, but also in an open position where the flow path of the gas is opened, such that the magnetic valve plug can react quickly to the magnetic field from the coil.

The Inventors found that repeated collisions between the magnetic valve plug and the wall surface reduces the surface roughness of the magnetic valve plug and the wall surface. The reduced surface roughness of the magnetic valve plug and the wall surface results in a mirror surface junction between the magnetic valve plug and the wall surface (a state where a high intermolecular bonding force is generated between the magnetic valve plug and the wall surface) or a state similar to the mirror surface junction. The Inventors confirmed that the mirror surface junction or a state similar to the mirror surface junction caused by repeated collisions between the magnetic valve plug and the wall surface gives rise to the response delay described above. A gas solenoid valve improved based on these findings will be described as a first embodiment.

Figure 1:
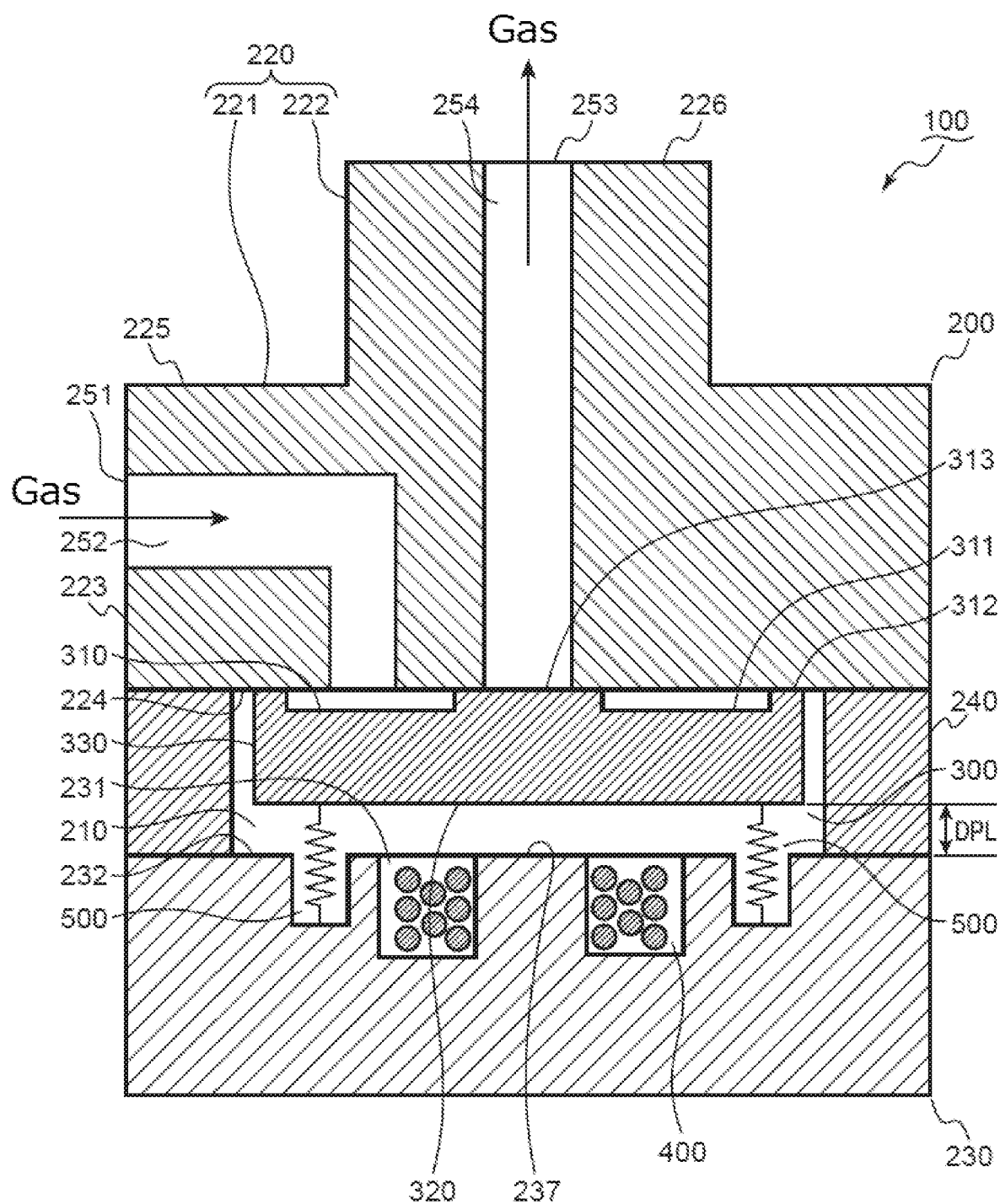
FIG. 1 is a schematic sectional view of a gas solenoid valve according to a first embodiment.

FIG. 1 is a schematic sectional view of a gas solenoid valve according to the first embodiment (hereinafter referred to as "the solenoid valve 100"). The solenoid valve 100 will be hereinafter described with reference to FIG. 1.

The solenoid valve 100 is used to control a flow rate of a gas. For example, the solenoid valve 100 may be used to control a flow rate of a fuel gas flowing into an auxiliary chamber of a gas engine. In this case, the solenoid valve 100 controls the flow rate of the gas flowing from the solenoid valve 100 such that the concentration of the fuel in the auxiliary chamber lies within an appropriate range.

The solenoid valve 100 includes a main body 200, a magnetic valve plug 300, a coil 400, and a plurality of spring members 500. The main body 200 forms a chamber 210 in which the magnetic valve plug 300 is to be displaced. The magnetic valve plug 300 reciprocates vertically in the chamber 210. The coil 400 derives power from an external power source (not shown). The coil 400 produces a magnetic field when powered. The magnetic valve plug 300 is magnetized in the presence of a magnetic field and is displaced toward the coil 400. The spring members 500 push the magnetic valve plug 300 upward in the absence of a magnetic field.

The main body 200 includes an upper block 220, a lower block 230, and a spacer ring 240. The lower block 230 is positioned below the upper block 220. The spacer ring 240 is disposed between the upper block 220 and the lower block 230. The upper block 220, the lower block 230, and the spacer ring 240 are fastened together with a screw (not shown) or other suitable fasteners (not shown). In the embodiment, the upper block 220, the lower block 230, and the spacer ring 240 have a substantially circular outline in a horizontal plane.

In the embodiment, the main body 200 as a whole has a cylindrical shape. Alternatively, a designer may apply other shapes to the main body. Accordingly, the principle of the embodiment is not limited by a particular shape of the main body.

In the embodiment, the main body 200 can be divided into three members (that is, the upper block 220, the lower block 230, and the spacer ring 240). Alternatively, a designer may apply other divisible structure to the main body. Accordingly, the principle of the embodiment is not limited by a particular structure of the main body.

The upper block 220 includes a lower portion 221 having a substantially cylindrical shape and an upper portion 22 having a substantially cylindrical shape. The lower portion 221 is thicker than the upper portion 222. The upper portion 222 is substantially concentric with the lower portion 221. The upper portion 222 projects upward from the lower portion 221.

The lower portion 221 includes a peripheral surface 223, a lower surface 224, and an upper surface 225 opposite to the lower surface 224. An inlet 251 for inflow of a gas is formed in the peripheral surface 223 between the lower surface 224 and the upper surface 225. In the lower portion 221, an upstream channel 252 extends from the inlet 251 and bends toward the lower surface 224. The inlet 251 constitutes the upstream end of the upstream channel 252. The downstream end of the upstream channel 252 is formed in the lower surface 224. When the magnetic valve plug 300 is magnetically attracted by the coil 400, the downstream end of the upstream channel 252 communicates with an upstream end of a downstream channel 254.

The upper portion 222 projecting from the upper surface 225 of the lower portion 221 includes an upper surface 226 having formed therein an outlet 253 for outflow of the gas. In the upper block 220, the downstream channel 254 is formed to communicate between the chamber 210 and the outlet 253. The outlet 253 constitutes a downstream end of the downstream channel 254. The upstream end of the downstream channel 254 is formed in the lower surface 224 of the lower portion 221. When the magnetic valve plug 300 is magnetically attracted by the coil 400, the downstream end of the upstream channel 252 communicates with an upstream end of a downstream channel 254. The downstream channel 254 extends substantially vertically along the axis common to the lower portion 221 and the upper portion 222.

The inlet 251 is connected to an external gas source (such as a fuel mixer, not shown). The gas flows from the gas source into the inlet 251. When the magnetic valve plug 300 is magnetically attracted by the coil 400, the gas flows through the inlet 251, the upstream channel 252, the chamber 210, and the downstream channel 254, and is discharged through the outlet 253.

The outlet 253 is connected to an external device (such as an auxiliary chamber of a gas engine, not shown) that performs a predetermined process using the gas. While the magnetic valve plug 300 is magnetically attracted by the coil 400, the gas in the chamber 210 flows into the downstream channel 254. The gas is then discharged through the outlet 253.

In the embodiment, the chamber 210, the upstream channel 252, and the downstream channel 254 constitute an example of the flow path. Alternatively, a designer may provide the main body with a different flow path having a different shape and/or structure. The principle of this embodiment is not limited by a particular shape and/or structure of the flow path.

The lower block 230 includes an upper surface 232 having an annular receiving groove 231 formed therein. The receiving groove 231 may have a circular outline in a horizontal plane. Alternatively, the receiving groove 231 may have a rectangular outline or other closed loop shape in a horizontal plane.

The coil 400 has a shape complementary to that of the receiving groove 231. The coil 400 is received in the receiving groove 231. The coil 400 is sealed within the receiving groove 231 with a resin or other sealants. Therefore, the lower block 230 can suitably retain the coil 400. In this embodiment, the lower block 230 is an example of the retainer.

The coil 400 is electrically connected to an external power source (not shown). When the power is supplied from the power source to the coil 400, the coil 400 produces a magnetic field. The magnetic valve plug 300 is magnetized in accordance with the magnetic field. As a result, the magnetic valve plug 300 is attracted toward the upper surface 232 of the lower block 230 having the receiving groove 231 formed therein.

The spacer ring 240 is disposed between the lower surface 224 of the upper block 220 and the upper surface 232 of the lower block 230. As a result, the chamber 210 is formed which is surrounded by the spacer ring 240, the lower surface 224 of the upper block 220, and the upper surface 232 of the lower block 230. The magnetic valve plug 300 is displaced vertically in the chamber 210.

Figure 2:
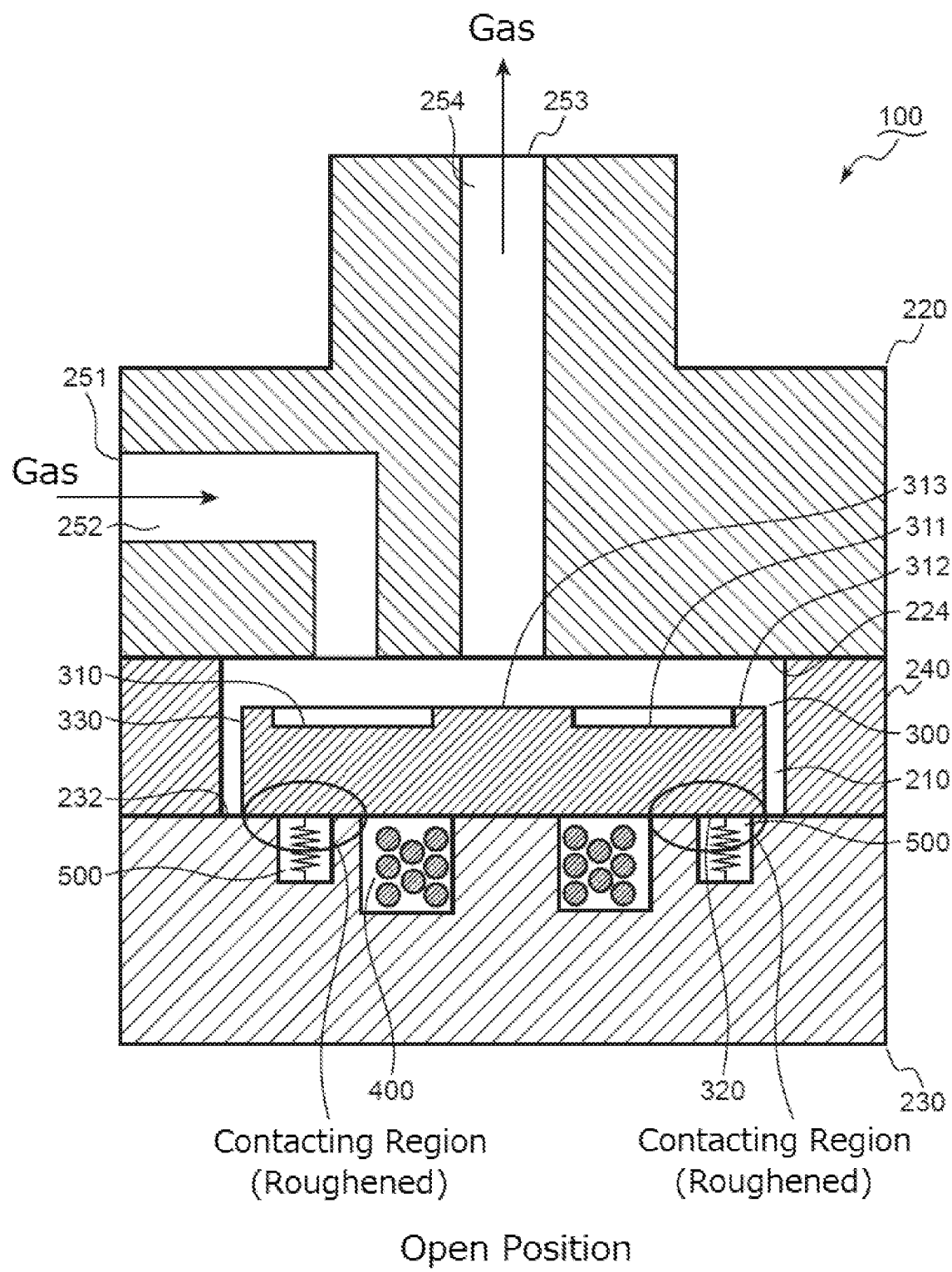
FIG. 2 is a schematic sectional view of the solenoid valve of FIG. 1.

FIG. 2 is a schematic sectional view of the solenoid valve 100. The magnetic valve plug 300 will be hereinafter described with reference to FIGS. 1 and 2.

In FIG. 1, the magnetic valve plug 300 is in a closed position where it blocks the downstream end of the upstream channel 252 and the upstream end of the downstream channel 254. In FIG. 2, the magnetic valve plug 300 is in an open position where it permits communication between the downstream end of the upstream channel 252 and the upstream end of the downstream channel 254.

The magnetic valve plug 300 is constituted by a single disk formed of iron or other magnetic materials. The magnetic valve plug 300 magnetized in accordance with the magnetic field produced by the coil 400 is attracted toward the upper surface 232 of the lower block 230 and reaches the open position. At this time, the spring members 500 are compressed by the magnetic valve plug 300. When the magnetic field disappears, the magnetic valve plug 300 is displaced upward by the resilience of the spring members 500 and reaches the closed position.

The magnetic valve plug 300 includes an upper surface 310, a lower surface 320, and a peripheral surface 330. The upper surface 310 of the magnetic valve plug 300 is opposed to the lower surface 224 of the upper block 220. When the magnetic valve plug 300 is in the closed position, the upper surface 310 of the magnetic valve plug 300 is partially in contact with the lower surface 224 of the upper block 220. The lower surface 320 of the magnetic valve plug 300 is opposed to the upper surface 232 of the lower block 230. When the magnetic valve plug 300 is in the open position, the lower surface 320 of the magnetic valve plug 300 is partially in contact with the upper surface 232 of the lower block 230. The peripheral surface 330 of the magnetic valve plug 300 is opposed to the spacer ring 240. Since the peripheral surface 330 of the magnetic valve plug 300 is slightly spaced apart from the spacer ring 240, no frictional force is produced between the magnetic valve plug 300 and the spacer ring 240. As a result, the magnetic valve plug 300 can be displaced at a high speed. In this embodiment, the magnetic valve plug 300 is an example of the valve plug.

The upper surface 310 of the magnetic valve plug 300 includes an annular recessed surface 311, an annular rim surface 312, and a circular valve surface 313. The recessed surface 311 is positioned between the rim surface 312 and the valve surface 313. The recessed surface 311 is recessed from the rim surface 312 and the valve surface 313. Since the magnetic valve plug 300 is thinner in the region where the recessed surface 311 is formed, the magnetic valve plug 300 has a reduced weight. As a result, the magnetic valve plug 300 can be displaced at a high speed.

The rim surface 312 is formed along the peripheral surface 330 of the magnetic valve plug 300 and encircles the recessed surface 311 and the valve surface 313. The rim surface 312 is substantially flush and concentric with the valve surface 313. When the magnetic valve plug 300 is in the closed position, the rim surface 312 and the valve surface 313 of the magnetic valve plug 300 are in contact with the lower surface 224 of the upper block 220.

The valve surface 313 is positioned directly under the downstream channel 254. The valve surface 313 is larger than the horizontal sectional area of the downstream channel 254. Accordingly, when the magnetic valve plug 300 is in the closed position, the valve surface 313 is partially in contact with the lower surface 224 of the upper block 220 around the upstream end of the downstream channel 254. As a result, the upstream end of the downstream channel 254 is closed by the valve surface 313. At this time, the region of the lower surface 224 of the upper block 220 around the upstream end of the downstream channel 254 (that is, the region of the lower surface 224 of the upper block 220 contacted by the valve surface 313) serves as a valve seat.

When the magnetic valve plug 300 is in the closed position and the coil 400 produces a magnetic field, the lower surface 320 of the magnetic valve plug 300 opposite to the upper surface 310 thereof is displaced downward in accordance with the magnetic field and contacts with the upper surface 232 of the lower block 230. That is, the magnetic valve plug 300 is displaced from the closed position to the open position. At this time, the valve surface 313 is spaced apart from the lower surface 224 of the upper block 220, and therefore, the gas flowing in through the inlet 251 passes through the upstream channel 252, the chamber 210, and the downstream channel 254, and is discharged through the outlet 253. In this embodiment, the lower surface 320 of the magnetic valve plug 300 is an example of the armature surface.

As shown in FIG. 2, when the magnetic valve plug 300 is in the open position, the lower surface 320 of the magnetic valve plug 300 is partially in contact with the upper surface 232 of the lower block 230. The portion of the lower surface 320 of the magnetic valve plug 300 contacting with the upper surface 232 of the lower block 230 determines the amount of displacement DPL (see FIG. 1) of the lower surface 320 of the magnetic valve plug 300 that is displaced from the open position to the closed position. In this embodiment, the portion of the lower surface 320 of the magnetic valve plug 300 contacting with the upper surface 232 of the lower block 230 is an example of the opposed surface.

FIG. 2 shows the contacting region between the lower surface 320 of the magnetic valve plug 300 and the upper surface 232 of the lower block 230. At least one of the lower surface 320 of the magnetic valve plug 300 and the upper surface 232 of the lower block 230 is roughened at the contacting region. The roughening process may be accomplished by providing a projection on at least one of the lower surface 320 of the magnetic valve plug 300 and the upper surface 232 of the lower block 230. Alternatively, the roughening process may be accomplished by providing a recess and/or a hole in at least one of the lower surface 320 of the magnetic valve plug 300 and the upper surface 232 of the lower block 230. Further alternatively, the roughening process may be accomplished by providing at least one of the lower surface 320 of the magnetic valve plug 300 and the upper surface 232 of the lower block 230 with such a shape and/or structure as to prevent tight attachment between the lower surface 320 of the magnetic valve plug 300 and the upper surface 232 of the lower block 230.

A designer of a solenoid valve may provide the magnetic valve plug with various shapes and/or structures. For example, the designer may provide the magnetic valve plug with a through-hole extending vertically so as to reduce resistance of a gas against the magnetic valve plug reciprocating vertically. The principle of the embodiment is not limited by a particular shape of the magnetic valve plug.

Second Embodiment

When the magnetic valve plug described in relation to the first embodiment is displaced from the closed position to the open position, the magnetic valve plug collides with the lower block. The collision between the magnetic valve plug and the lower block causes microscopic deformation of the surfaces of the magnetic valve plug and the lower block. The microscopic surface deformation causes a mirror surface junction between the magnetic valve plug and the lower block. The Inventors devised a technique for reducing the tendency to cause the microscopic surface deformation. In the second embodiment, the technique for suppressing the microscopic surface deformation will be described.

Figure 3:
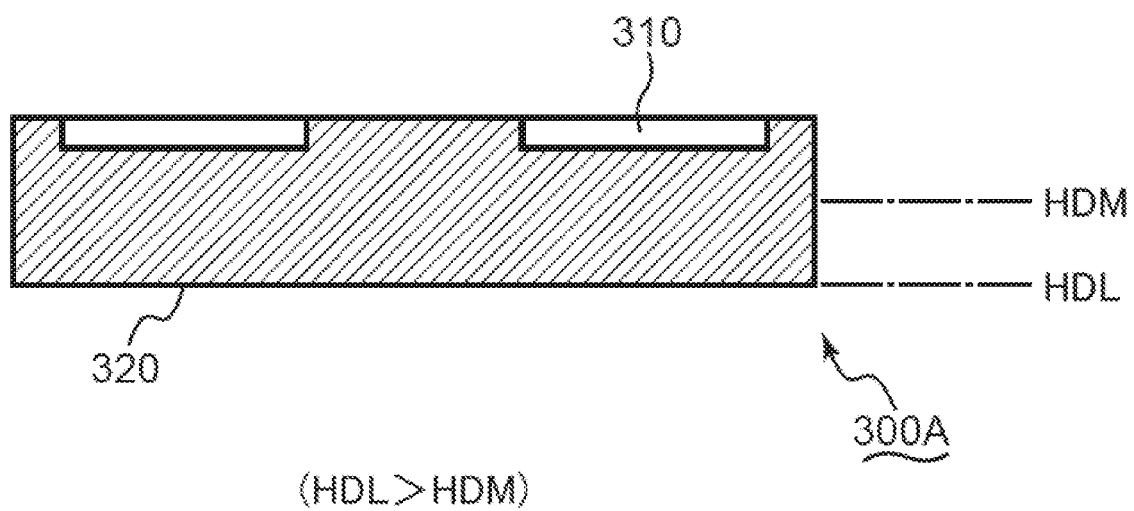
FIG. 3 is a schematic sectional view of a magnetic valve plug according to a second embodiment.

FIG. 3 is a schematic sectional view of a magnetic valve plug 300A according to the second embodiment. The magnetic valve plug 300A will be hereinafter described with reference to FIGS. 1 and 3.

The magnetic valve plug 300A can be used as the magnetic valve plug 300 described with reference to FIG. 1. Thus, the description related to the magnetic valve plug 300 can be applied to the magnetic valve plug 300A.

FIG. 3 shows a hardness HDL at the lower surface 320 and a hardness HDM at the intermediate position between the lower surface 320 and the upper surface 310 (that is, a position in the magnetic valve plug 300A). The hardnesses HDL, HDM may be based on either Rockwell hardness or Vickers hardness. The principle of this embodiment is not limited by a particular definition of the hardnesses HDL, HDM.

As shown in FIG. 3, the hardness HDL is higher than the hardness HDM. Accordingly, almost no microscopic deformation occurs in the lower surface 320.

To make the hardness HDL higher than the hardness HDM, a manufacturer of the magnetic valve plug 300A may perform various surface treatments (thermal surface treatments or chemical surface treatments). For example, the manufacturer may perform quenching, nitriding, or carburizing. The principle of the embodiment is not limited by a particular surface treatment performed on the magnetic valve plug 300A.

Third Embodiment

The roughening process described in relation to the first embodiment may be accomplished by forming a projection on the upper surface of the lower block. In the third embodiment, the lower block including the upper surface having a projection formed thereon will be described.

Figure 4:
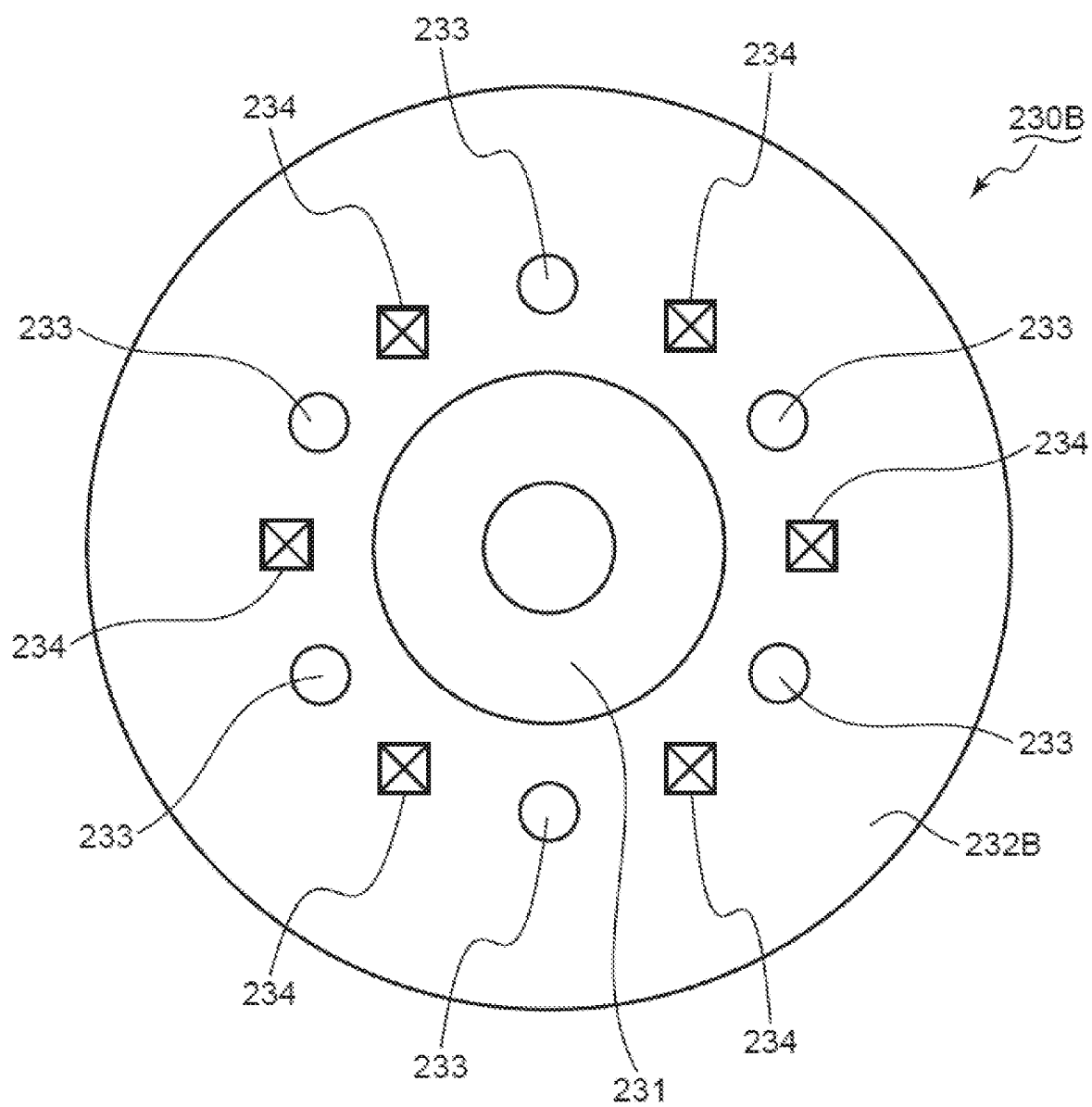
FIG. 4 is a schematic plan view of a lower block according to a third embodiment.

FIG. 4 is a schematic plan view of a lower block 230B according to the third embodiment. The lower block 230B will be described with reference to FIGS. 1, 2, and 4.

The lower block 230B can be used as the lower block 230 described with reference to FIG. 1. Thus, the description related to the lower block 230 may be applied to the lower block 230B.

The lower block 230B includes an upper surface 232B. As in the first embodiment, the upper surface 232B has a receiving groove 231 formed therein. The description of the first embodiment may be applied to the receiving groove 231.

The upper surface 232B has six receiving bores 233 formed therein. The six receiving bores 233 are arranged at substantially regular intervals in an imaginary circle concentric with the receiving groove 231. When the magnetic valve plug 300 is in the open position (see FIG. 2), the spring members 500 described with reference to FIG. 1 are entirely received in the six receiving bores 233, respectively. When the magnetic valve plug 300 is in the closed position (see FIG. 1), the upper ends of the spring members 500 connected to the magnetic valve plug 300 project from the receiving bores 233.

When four spring members are built in the solenoid valve, the upper surface of the lower block may have four receiving bores formed therein. When eight spring members are built in the solenoid valve, the upper surface of the lower block may have eight receiving bores formed therein. Thus, the principle of this embodiment is not limited by the number of receiving bores formed in the upper surface of the lower block.

On the upper surface 232B, there are six projections 234 projecting toward the magnetic valve plug 300 (see FIG. 1). Each of the projections 234 is positioned between two adjacent receiving bores 233. The six projections 234 are arranged at substantially regular intervals in an imaginary circle concentric with the receiving groove 231. The projections 234 may have a hemispheric shape. Alternatively, the projections 234 may have a columnar shape. Further alternatively, the projections 234 may be spindle-shaped. The principle of the embodiment is not limited by a particular shape of the projections 234.

The annular region in which the six receiving bores 233 and the six projections 234 are arranged alternately corresponds to the contacting region described with reference to FIG. 2. Since the lower surface 320 of the magnetic valve plug 300 contacts only with the projections 234, the contact area between the magnetic valve plug 300 and the lower block 230B is remarkably small. Even when the magnetic valve plug 300 displaced toward the open position repeatedly collides with the lower block 230B to form mirror surfaces of the magnetic valve plug 300 and the lower block 230B, the binding force between the magnetic valve plug 300 and the lower block 230B is not excessively large.

In the embodiment, the number of projections 234 is the same as that of the receiving bores 233. Alternatively, a designer of the lower block may determine the number of the projections irrespective of the number of the receiving bores. Thus, the principle of this embodiment is not limited by the number of projections.

In the embodiment, the six projections 234 are arranged annularly along with the six receiving bores 233. Alternatively, a designer may determine the arrangement of the projections irrespective of the arrangement of the receiving bores. Accordingly, the principle of the embodiment is not limited by a particular arrangement of the projections.

The six projections 234 may be replaced with one or more recesses or holes. Each of the recesses may be constituted by a groove extending radially between adjacent receiving bores. Each of the holes may be constituted by a throughhole or a blind hole formed between adjacent receiving bores 233. Roughening of the contacting region may be accomplished with various recesses formed in the upper surface of the lower block.

Fourth Embodiment

The roughening process described in relation to the third embodiment is applied to the upper surface of the lower block. Alternatively or additionally, the roughening process may be applied to the lower surface of the magnetic valve plug. In the fourth embodiment, the magnetic valve plug having a roughened lower surface will be described.

Figure 5:
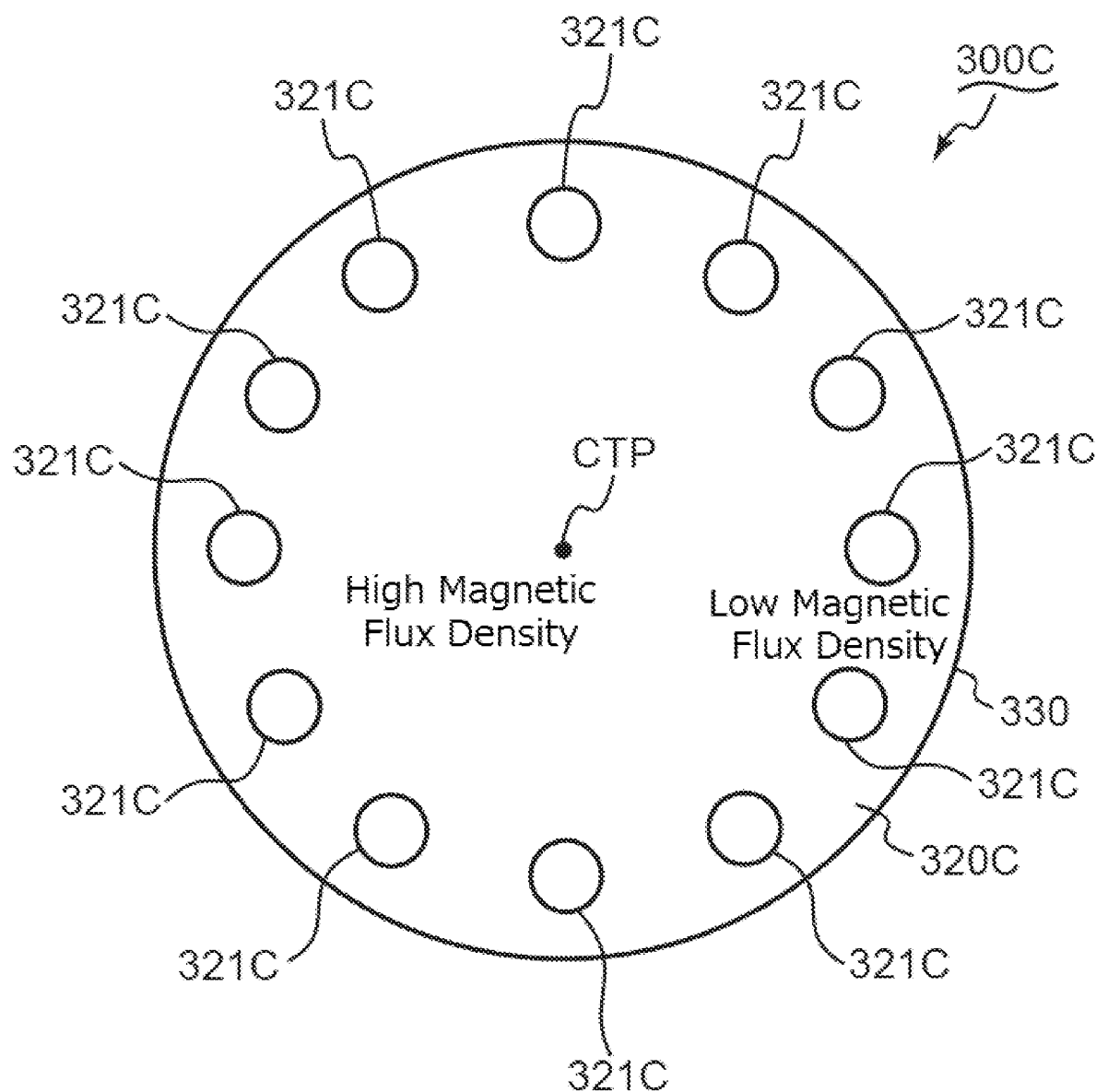
FIG. 5 is a bottom view of a magnetic valve plug according to a fourth embodiment.

FIG. 5 is a schematic bottom view of a magnetic valve plug 300C according to the fourth embodiment. The same reference signs as used in the first embodiment will be applied to the elements having the same concepts as in the first embodiment. The magnetic valve plug 300C will be hereinafter described with reference to FIGS. 1, 2, and 5.

The magnetic valve plug 300C can be used as the magnetic valve plug 300 described with reference to FIG. 1. Thus, the description related to the magnetic valve plug 300 can be applied to the magnetic valve plug 300C.

As in the first embodiment, the magnetic valve plug 300C includes the upper surface 310 (see FIG. 1) and the peripheral surface 330. The description of the first embodiment may be applied to the upper surface 310 and the peripheral surface 330.

The magnetic valve plug 300C includes a lower surface 320C encircled by the peripheral surface 330. The lower surface 320C is opposed to the lower block 230 described with reference to FIG. 1.

The lower surface 320C has twelve receiving bores 321C formed therein. FIG. 5 shows a center point CTP of the lower surface 320C having a circular shape. The twelve receiving bores 321C are arranged at substantially regular intervals around the center point CTP. The center point CTP corresponds substantially to the center of the coil 400. Accordingly, the magnetic flux density around the center point CTP is high. The magnetic flux density decreases from the region around the center point CTP where the magnetic flux concentrates, toward the peripheral surface 330. Since the twelve receiving bores 321C are close to the peripheral surface 330, there is less tendency of occurrence of residual magnetization of the magnetic valve plug 300C. The annular region in which the twelve receiving bores 321 are arranged corresponds to the contacting region described with reference to FIG. 2.

The upper ends of the spring members 500 (see FIG. 1) may be received in only a part of the twelve receiving bores 321C. For example, when six spring members 500 are built in the solenoid valve 100, the spring members 500 may be arranged such that the receiving bores 321C receiving the upper ends of the spring members 500 and the receiving bores 321C not receiving the upper ends of the spring members 500 are arranged alternately. In the absence of the magnetic flux from the coil 400 (see FIG. 1), the six spring members 500 cause the lower surface 320C of the magnetic valve plug 300C to be spaced apart from the upper surface 232 of the lower block 230 (see FIG. 1). As a result, the valve surface 313 (see FIG. 1) is seated on the region of the lower surface 224 of the upper block 220 around the upstream end of the downstream channel 254 (see FIG. 1) (that is, the region serving as a valve seat). Thus, the downstream channel 254 is closed by the magnetic valve plug 300C. In this embodiment, a vertical line that passes the center point CTP is an example of the central axis of the valve plug.

A part of the twelve receiving bores 321C may be replaced with projections or grooves. Roughening of the contacting region may be accomplished with various recesses or projections formed in or on the lower surface of the magnetic valve plug 300.

Fifth Embodiment

Most part of the lower block that retains the coil is formed of a magnetic material so as to form a magnetic path. However, a designer of the solenoid valve may build a non-magnetic layer in the lower block for the purpose of controlling the formation pattern of the magnetic path or other various purposes. In the fifth embodiment, the lower block having the non-magnetic layer built in will be described.

Figure 6:
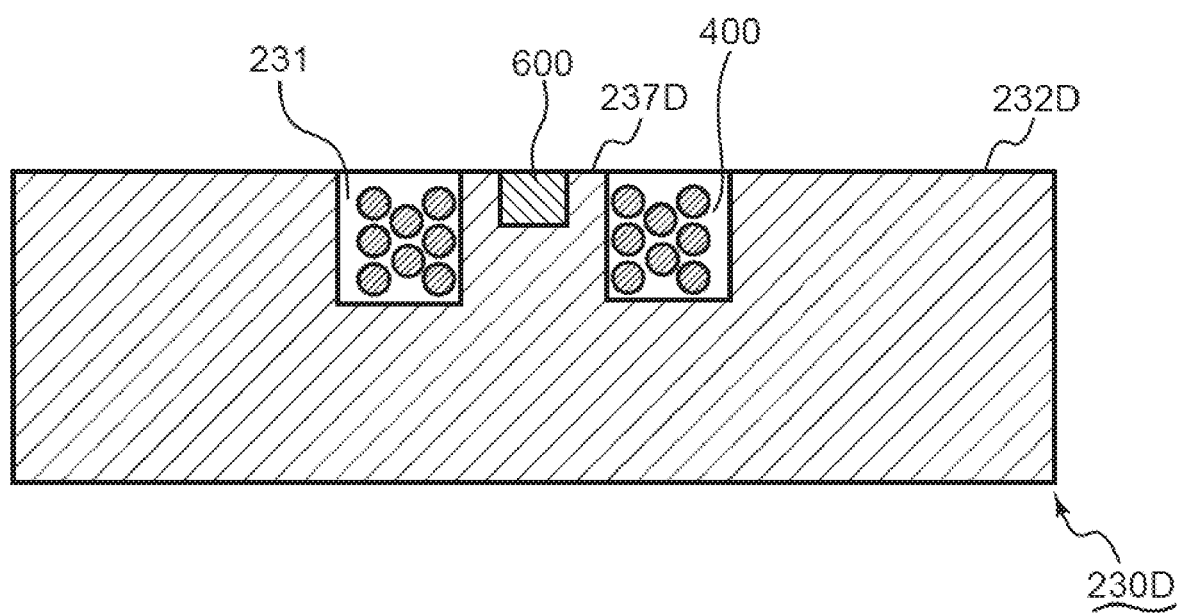
FIG. 6 is a schematic plan view of a lower block according to a fifth embodiment.

FIG. 6 is a schematic sectional view of a lower block 230D according to the fifth embodiment. The same reference signs as used in the first embodiment will be applied to the elements having the same concepts as in the first embodiment. The lower block 230D will be described with reference to FIGS. 1 and 6.

The lower block 230D can be used as the lower block 230 described with reference to FIG. 1. Thus, the description related to the lower block 230 may be applied to the lower block 230D.

The lower block 230D includes an upper surface 232D opposed to the lower surface 320 (see FIG. 1) of the magnetic valve plug 300 (see FIG. 1). As in the first embodiment, the upper surface 232D has an annular receiving groove 231 formed therein to receive the coil 400. The description of the first embodiment may be applied to the receiving groove 231 and the coil 400.

The upper surface 232D includes a central region 237D encircled by the coil 400. In the central region 237D, a non-magnetic layer 600 is embedded as a part of the solenoid valve 100 (see FIG. 1). The magnetic path of the magnetic flux produced by the coil 400 bypasses the non-magnetic layer 600. The non-magnetic layer 600 optionally contacts with the lower surface 320 of the magnetic valve plug 300 in the open position.

A designer can dispose the non-magnetic layer at various positions on the upper surface of the lower block and/or various positions on the lower surface of the magnetic valve plug so as to satisfy the required performance of the solenoid valve. Accordingly, the principle of the embodiment is not limited by a particular position of the non-magnetic layer.

Based on the design principle described in relation to the various embodiments described above, a designer can design various types of solenoid valves. A part of the various features described in relation to any one of the various embodiments described above may be applied to the solenoid valve described in relation to another of the embodiments.

The exemplary solenoid valves described in relation to the various embodiments described above mainly have the following features.

The gas solenoid valve according to an aspect of the above embodiments controls a flow rate of a gas. The gas solenoid valve comprises: a main body including an inlet for inflow of the gas, an outlet for outflow of the gas, and a flow path communicating between the inlet and the outlet and guiding the gas from the inlet to the outlet and a valve plug to be displaced in the main body between a closed position where the flow path is closed and an open position where the flow path is opened. The main body includes a retainer and a valve seat, the retainer retaining a coil that produces a magnetic field, the valve seat receiving the valve plug to be seated thereon. The valve plug includes an armature surface and a valve part, the armature surface being displaced in accordance with the magnetic field, the valve part being formed on an opposite side to the armature surface integrally with the armature surface. The armature surface includes an opposed surface opposed to the retainer. The opposed surface contacts with the retainer when the valve plug is in the open position, so as to determine an amount of displacement of the armature surface from the closed position where the valve part contacts with the valve seat to the open position where the valve part is spaced apart from the valve seat. In a contacting region where the opposed surface and the retainer contact with each other, at least one of the opposed surface and a surface of the retainer is roughened.

With the above arrangement, the opposed surface contacts with the retainer in the presence of the magnetic field. Therefore, a designer can configure the gas solenoid valve to have a small size in the direction of displacement of the valve plug. As opposed to a solenoid valve handling a liquid as a working fluid, the flow path of the gas solenoid valve is provided with a gas having a lower surface tension than a liquid, and therefore, there is less tendency that the opposed surface is adhered to the surface of the retainer. In addition, since the contacting region is roughened, no excessive intermolecular bonding force occurs between the opposed surface and the retainer even after the collisions between the opposed surface and the retainer are repeated for a long period. Therefore, the gas solenoid valve can retain a high response performance for a long period.

As to the above configuration, the opposed surface of the valve plug that contacts with the retainer may have a higher hardness than an inner portion of the valve plug.

According to the above configuration, the opposed surface of the valve plug that contacts with the retainer has a higher hardness than an inner portion of the valve plug, and therefore, there is less tendency that microscopic surface deformation occurs in the contacting region due to the repeated collisions between the opposed surface and the retainer. As a result, the intermolecular bonding force between the opposed surface and the retainer is maintained at a low level. Therefore, the gas solenoid valve can retain a high response performance for a long period.

As to the above configuration, in the contacting region, at least one of the opposed surface and a surface of the retainer may have at least one of a recess, a hole, or a projection formed therein or thereon to roughen the contacting region.

According to the above configuration, at least one of a recess, a hole, or a projection is formed in the contacting region, and therefore, the contact area between the opposed surface and the retainer is small. Since no excessive intermolecular bonding force occurs between the opposed surface and the retainer, the gas solenoid valve can retain a high response performance for a long period.

As to the above configuration, at least one of the recess and the hole is formed in a location on the armature surface having less magnetic flux produced from the coil than other locations.

According to the above configuration, at least one of the recess and the hole is formed in a location on the armature surface having less magnetic flux produced from the coil than other locations, and therefore, residual magnetization of the valve plug is maintained at a low level for a long period.

As to the above configuration, the gas solenoid valve may further comprise a non-magnetic layer formed in at least one of the armature surface and the surface of the retainer.

According to the above configuration, the gas solenoid valve further comprises a non-magnetic layer formed in at least one of the armature surface and the surface of the retainer, and therefore, a designer of the gas solenoid valve can control the formation pattern of the magnetic path using the non-magnetic layer.

As to the above configuration, the gas solenoid valve may further comprise a plurality of spring members for causing the opposed surface to be spaced apart from the retainer and causing the valve part to be seated on the valve seat, so as to close the flow path in an absence of the magnetic field. In the contacting region, a plurality of openings may be formed at regular intervals around a central axis of the valve plug extending in a direction of displacement of the valve plug. The end portions of the plurality of spring members may be received in a part of the plurality of openings.

According to the above configuration, a worker fabricating the solenoid valve can readily mount the valve plug on the plurality of spring members using a part of the plurality of openings.

As to the above configuration, the surface of the retainer may include a first region encircled by the coil. The armature surface may include a second region that contacts with the first region when the valve plug is displaced to the open position. The contacting region may encircle the first region and the second region.

According to the above configuration, the second region contacts with the first region, and therefore, the magnetic path of the magnetic flux passing the first region and the second region can be formed suitably. Since the contacting region encircles the first region and the second region, no excessive magnetic flux density occurs even when at least one of a recess, a hole, and a groove or a plurality of first openings and a plurality of second openings are formed in the contacting region. Therefore, there is less tendency of occurrence of residual magnetization of the valve plug.

As to the above configuration, the flow path may communicate with an auxiliary chamber of a gas engine.

According to the above configuration, the flow path communicates with an auxiliary chamber of a gas engine, and therefore, the gas solenoid valve can be used suitably for ignition in the auxiliary chamber.

As to the above configuration, the flow path may include a chamber containing a valve plug to be displaced between the closed position and the open position. The gas may flow into the chamber.

According to the above configuration, the gas is supplied into the chamber containing the valve plug to be displaced, and therefore, the opposed surface and the surface of the retainer are exposed to the gas. Since there is less tendency that a substance causing the opposed surface to be adhered to the retainer is interposed between the opposed surface and the retainer, the gas solenoid valve can retain a high response performance for a long period.

As to the above configuration, the valve plug may be formed of a single plate member.

According to the above configuration, the valve plug is formed of a single plate member, and therefore, the valve plug has s small weight. Therefore, the gas solenoid valve can achieve a high response performance.

INDUSTRIAL APPLICABILITY

The principle of the above embodiments may be suitably used in various technical fields requiring control of a flow rate of a gas.

What is claimed is:

1. A gas solenoid valve for controlling a flow rate of a gas, comprising:
  a main body including an inlet for inflow of the gas, an outlet for outflow of the gas, a flow path communicating between the inlet and the outlet and guiding the gas from the inlet to the outlet, a retainer, and a valve seat, the retainer retaining a coil configured to produce a magnetic field; and
  a valve plug to be displaced in the main body between a closed position where the flow path is closed and an open position where the flow path is opened by switching producing and disappearing the magnetic field,
  wherein the valve plug is constituted by a single plate member formed of magnetic material,
  wherein the plate member includes an armature surface and a valve part, the armature surface being opposed to the retainer, the valve part being formed on an opposite side to the armature surface and being seated on the valve seat in the closed position, and
  wherein the retainer is roughened in a contacting region where the retainer contacts with the armature surface when the valve plug is in the open position,
  wherein the gas solenoid valve further comprises:
  a spring member for causing the armature surface to be spaced apart from the retainer and causing the valve part to be seated on the valve seat, so as to close the flow path in an absence of the magnetic field,
  wherein, in the contacting region, at least one of the armature surface and a surface of the retainer has a first receiving bore for receiving an end of the spring member and a second receiving bore not receiving the end of the spring member, the first receiving bore and the second receiving bore being in symmetrical positions.

2. The gas solenoid valve of claim 1, wherein the armature surface has a higher hardness than an inner portion of the valve plug.

3. The gas solenoid valve of claim 1, wherein, in the contacting region, the surface of the retainer has at least one of a recess, a hole, or a projection formed therein or thereon to roughen the contacting region.

4. The gas solenoid valve of claim 3, wherein at least one of the recess and the hole is formed in a location on the armature surface having less magnetic flux produced from the coil than other locations.

5. The gas solenoid valve of claim 1, further comprising a non-magnetic layer formed in at least one of the armature surface and the surface of the retainer.

6. The gas solenoid valve of claim 1,
  wherein, in the contacting region, a plurality of openings including the first receiving bore and the second receiving bore are formed at regular intervals around a central axis of the valve plug extending in a direction of displacement of the valve plug.

7. The gas solenoid valve of claim 3, wherein the surface of the retainer includes a first region encircled by the coil,
  wherein the armature surface includes a second region that contacts with the first region when the valve plug is displaced to the open position, and
  wherein the contacting region encircles the first region and the second region.

8. The gas solenoid valve of claim 1, further comprising a plurality of spring members including the spring member, the plurality of spring members being in symmetrical positions.

9. A gas solenoid valve for controlling a flow rate of a gas, comprising:
  a main body including an inlet for inflow of the gas, an outlet for outflow of the gas, a flow path communicating between the inlet and the outlet and guiding the gas from the inlet to the outlet, a retainer and a valve seat, the retainer retaining a coil configured to produce a magnetic field; and
  a valve plug to be displaced in the main body between a closed position where the flow path is closed and an open position where the flow path is opened by switching producing and disappearing the magnetic field,
  wherein the valve plug is constituted by a single plate member formed of magnetic material,
  wherein the plate member includes an armature surface and a valve part, the armature surface being opposed to the retainer, the valve part being formed on an opposite side to the armature surface and being seated on the valve seat in the closed position, and
  wherein the plate member is roughened on an opposed surface included in the armature surface, the opposed surface contacting with the retainer when the valve plug is in the open position and being spaced apart from the retainer when the valve plug is in the closed position,
  wherein the gas solenoid valve further comprises:
  a spring member for causing the opposed surface to be spaced apart from the retainer and causing the valve part to be seated on the valve seat, so as to close the flow path in an absence of the magnetic field,
  wherein, in the contacting region, at least one of the opposed surface and a surface of the retainer has a first receiving bore for receiving an end of the spring member and a second receiving bore not receiving the end of the spring member, the first receiving bore and the second receiving bore being in symmetrical positions.

10. The gas solenoid valve of claim 9, wherein the opposed surface has at least one of a recess, a hole, or a projection formed therein or thereon to roughen the opposed surface.

11. The gas solenoid valve of claim 9, further comprising a plurality of spring members including the spring member, the plurality of spring members being in symmetrical positions.

* * * * *